Feb. 6, 1923.

M. NUTA.
INTERNAL COMBUSTION ENGINE.
FILED JUNE 1, 1920.

Inventor
Meyer Nuta
By Arthur F. Durand
Atty.

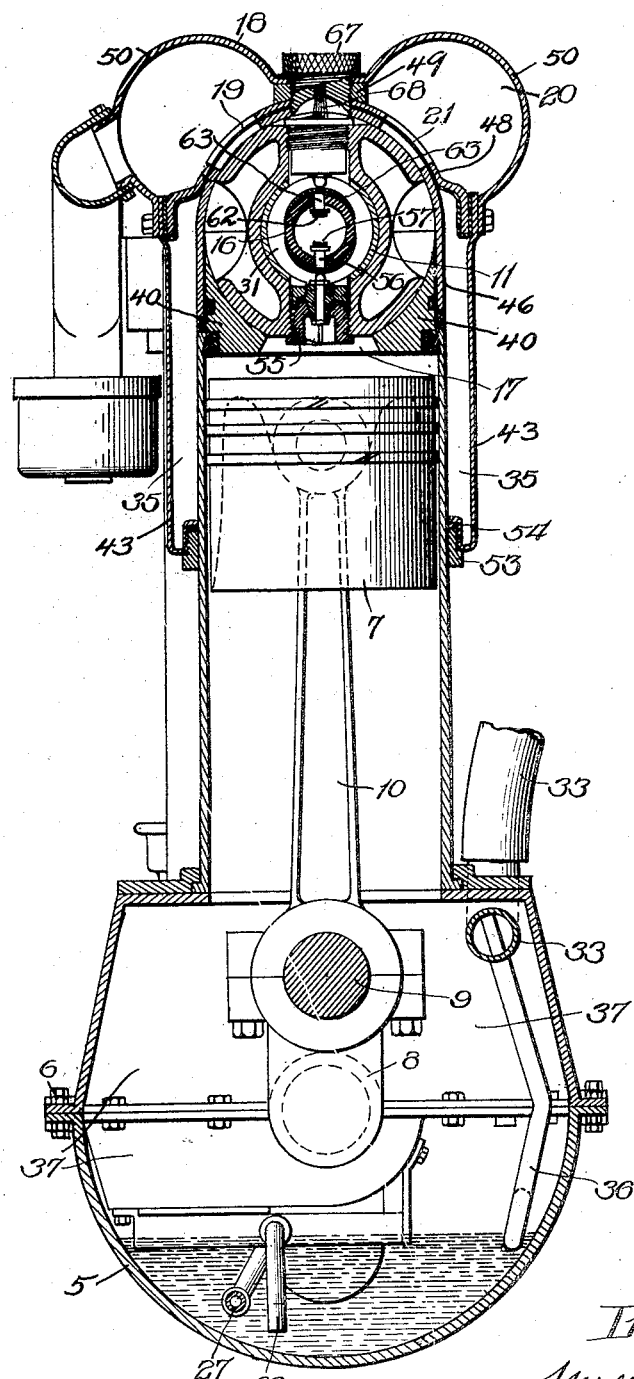

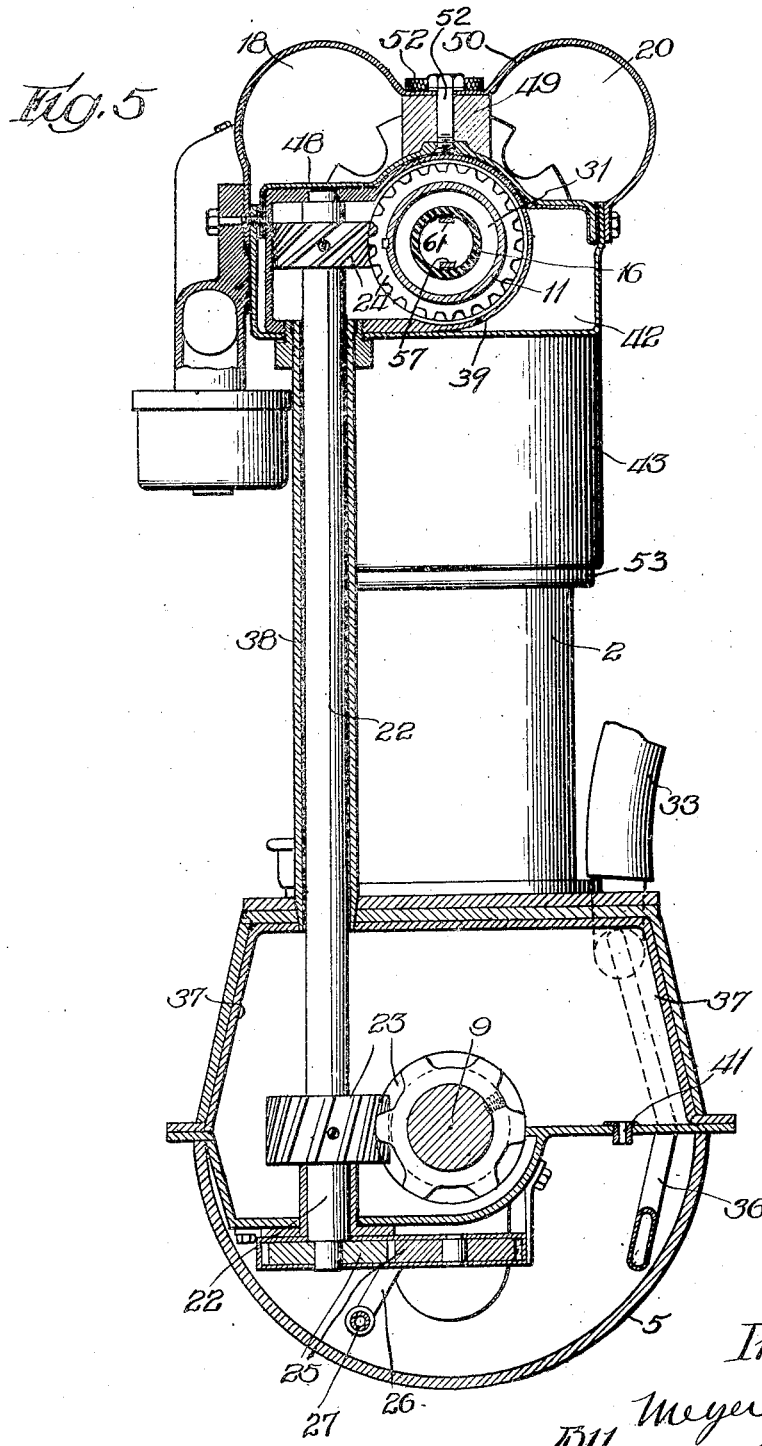

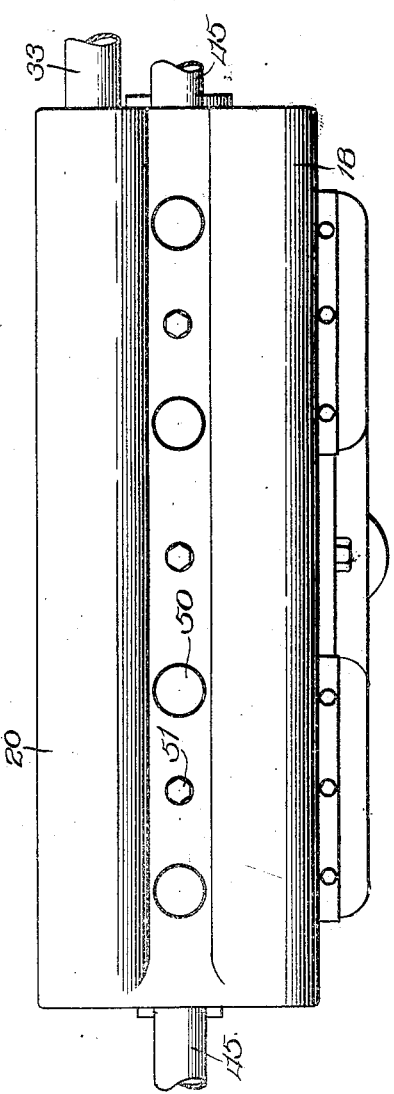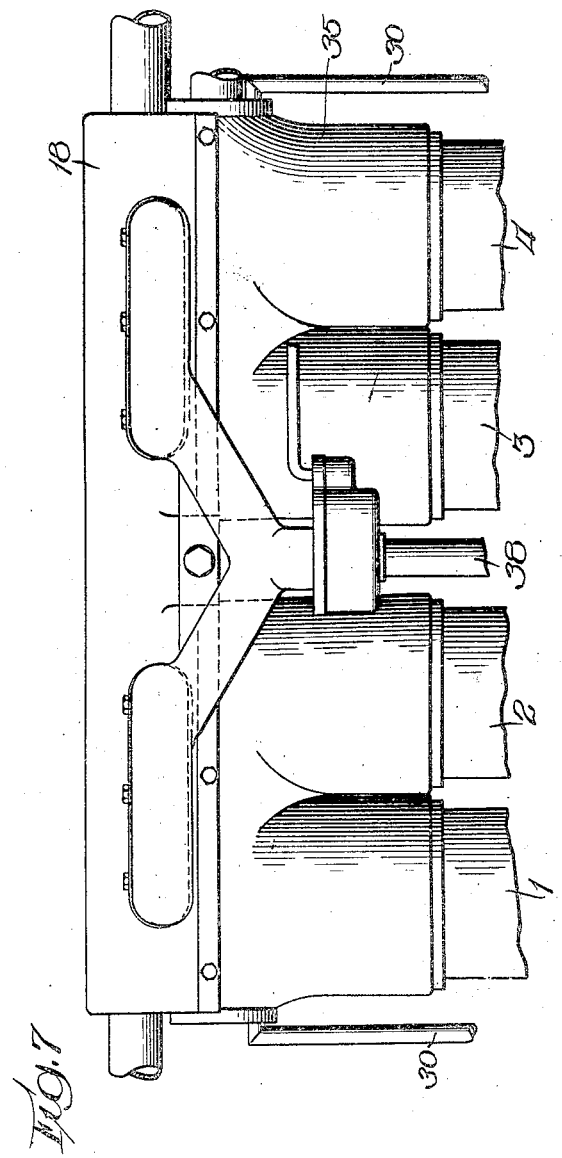

Patented Feb. 6, 1923.

1,444,203

UNITED STATES PATENT OFFICE.

MEYER NUTA, OF CHICAGO, ILLINOIS.

INTERNAL-COMBUSTION ENGINE.

Application filed June 1, 1920. Serial No. 385,435.

*To all whom it may concern:*

Be it known that I, MEYER NUTA, a citizen of the United States of America, and a resident of Chicago, Illinois, have invented a certain new and useful Improvement in Internal-Combustion Engines, of which the following is a specification.

This invention relates to internal combustion engines, and contemplates, more especially, an engine of this class in which the valves are of a rotary character, instead of being of oscillatory or reciprocating type.

Generally stated, the object of the invention is to provide a novel and improved construction whereby, in an engine of this particular type, the rotary valves are arranged to operate in an efficient and more satisfactory manner than heretofore; to provide an improved construction and arrangement whereby the spark plugs are carried by the said rotary valves; to provide an improved construction and arrangement whereby the water for cooling the engine is circulated in a novel and efficient manner to cool not only the cylinders of the engine, but also the interior of the crank casing; to provide an improved construction and arrangement for circulating and feeding the oil to the different bearings; and to provide certain details and features of construction and combinations tending to increase the general efficiency and the desirability of an internal combustion engine of this particular construction.

To these and other useful ends the invention consists in matters hereinafter set forth and claimed and shown in the accompanying drawings, in which—

Fig. 4 is a vertical section on line 4—4 in Fig. 1.

Fig. 5 is a vertical section on line 5—5 in Fig. 1.

Fig. 6 is a top view or plan of said engine.

Fig. 7 is a side elevation of the upper portion of the engine.

Figure 1:
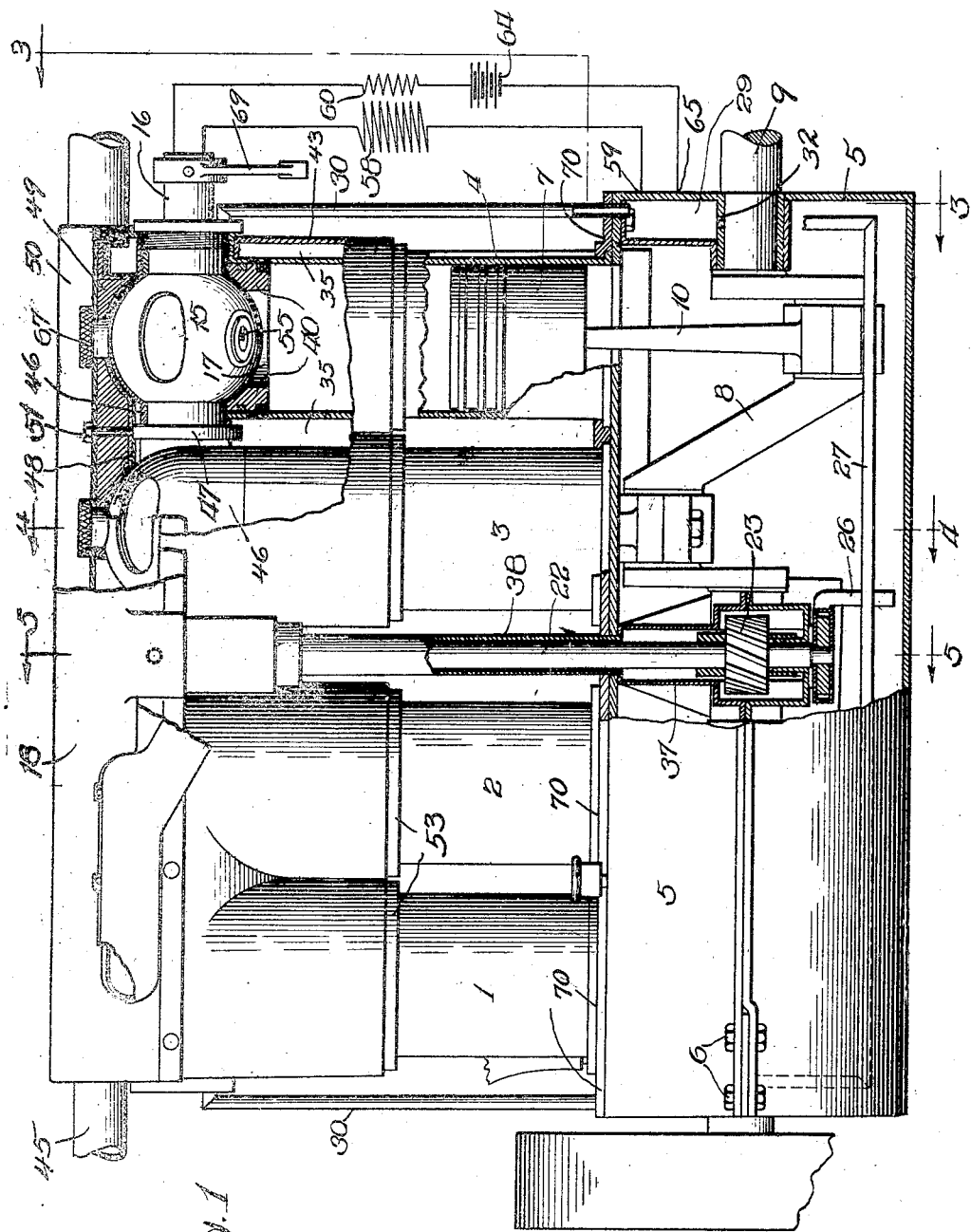
Fig. 1 is a side elevation of an internal combustion engine embodying the principles of the invention, showing portions thereof broken away, and other portions in vertical section.
Figure 2:
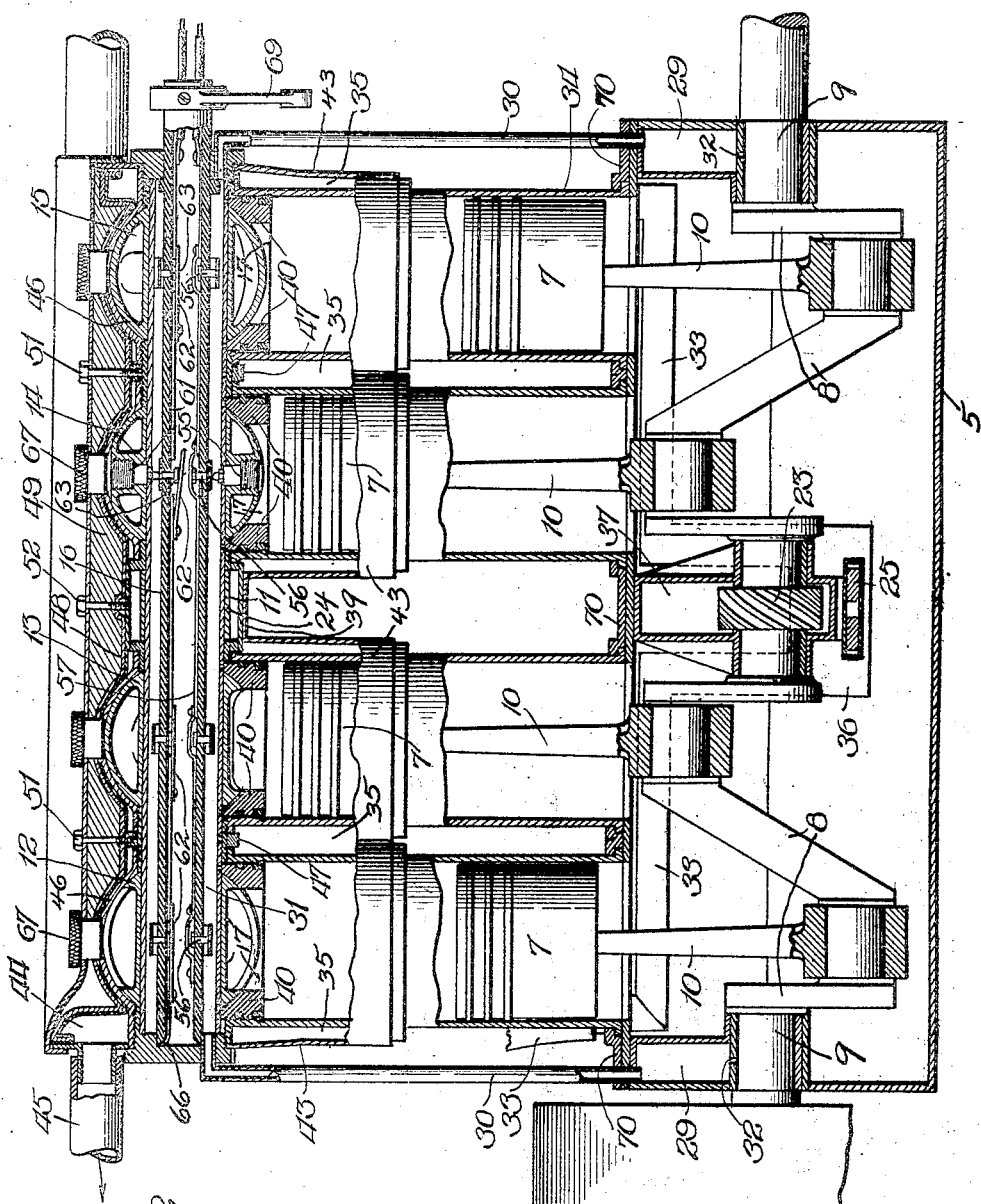
Fig. 2 is a vertical longitudinal section of said engine.
Figure 3:
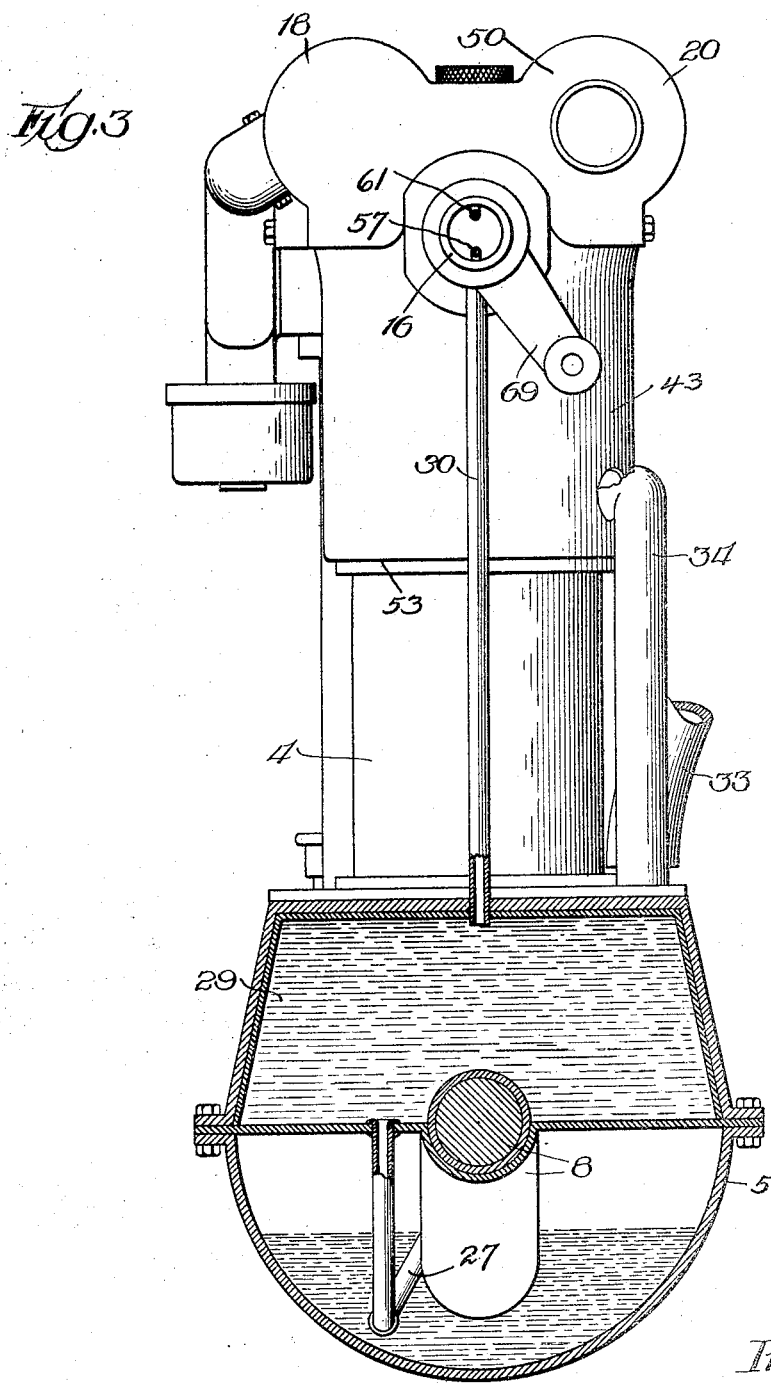
Fig. 3 is an end elevation of said engine, with the crank casing thereof in vertical section, the section being taken on line 3—3 in Fig. 1.

As thus illustrated, the invention comprises the four cylinders 1, 2, 3, and 4, of any suitable character, mounted in upright position on the crank casing 5, the latter being made in upper and lower sections and connected together by bolts 6, or in any suitable manner. Pistons 7 are enclosed in said cylinders and connected to the cranks 8 of the crank shaft 9 by means of pitmen 10, said cranks being set at different angles, so that the two end or outside pistons operate in unison, while the two pistons at the center of the engine also work in unison.

The valve mechanism at the top of the engine comprises a rotary hollow shaft 11, suitably supported in bearings formed in the structure of the engine, and upon this shaft are mounted the four spherical valves 12, 13, 14, and 15, these valves being made hollow and provided with openings at opposite sides thereof, and the valves and their openings being set at different angles on the shaft, so that they are properly timed in their operation relatively to the positions of the different pistons. A stationary tube 16 extends longitudinally through the shaft or tube 11, with space between the two tubes. The top of each cylinder has a port 17 through which the fuel is admitted to the cylinder from the hollow valve, when the latter is rotated into a position to admit fuel to the cylinder. The manifold 18 at one side of the top of the engine is of any suitable character and is provided with as many inlet ports 19 as there are spherical valves, and at the other side of the engine an exhaust passage 20 is provided with outlet ports 21 opposite said valves.

The mechanism for operating the valves is as follows: A vertical shaft 22 is arranged at one side of the engine and is provided at its lower end with a worm gearing connection 23 with the shaft 9 in the crank casing. At its upper end this shaft 22 is provided with a worm gearing connection 24 with the hollow shaft or tube 11, whereby rotation of the crank shaft operates the said hollow shaft, the arrangement being such that the hollow shaft 11 rotates once for every four rotations of the crank shaft. Thus the spherical valves rotate in one direction only, when the engine is running normally, and are so positioned on the hollow shaft 11 that they admit the fuel to the cylinders at the proper time, and allow the exhaust to escape therefrom, in a manner that will be readily understood. Of course, these valves can rotate in the other direction, if necessary.

The shaft 22 also operates the mechanism for supplying oil to the bearings, and for circulating the lubricating oil, as follows: A rotary pump 25, of any suitable character, is provided in the crank casing and operated by the lower end of the shaft 22, in the manner shown more clearly in Fig. 5, said pump having an intake 26 for drawing the oil from the reservoir in the crank casing. The oil is forced out by the pump into the pipe 27 and from the latter through the oil chambers 29 at the opposite ends of the crank casing, and from the said chambers 29 through the pipes 30 to the space 31 between the hollow shaft or tube 11 and the stationary tube 16, so that this space is kept filled with oil. From the spaces 29 oil is fed, through small openings of any suitable character, to the bearings 32 that support the crank shaft. The crank shaft operates in the oil carried in the crank casing, and the cranks splash the oil upwardly into the cylinders to lubricate the pistons. From the space 31 oil is admitted through small openings of any kind to the bearings in which the shaft 11 is mounted.

The cooling system comprises a pipe 33 that leads downwardly into the crank casing at one end thereof, and then through the casing to the other end of the latter, and then upwardly at 34 to the water jacket 35 which surrounds the cylinders, the water being pumped into these passages by a pump operated by the engine, or by any suitable means. Preferably, as shown, the two horizontal sections 33 of the water pipe are connected together by a U-shaped section 36, which latter extends downward and around certain structural features including the housing 37 for the worm gearing 23, as shown in Figs. 4 and 5, said housing being connected by a vertical tube 38 (which encloses the shaft 22) with the housing 39 which encloses the worm gearing 24 above. By this arrangement, the oil which escapes through the small openings in the shaft 11 to lubricate the bearings of the latter, follows along the shaft to lubricate the bearings 40 of the spherical valves and enters the housing 39 to lubricate the worm gearing 24, and then flows downward through the tube 38 to the interior of the housing 37 to lubricate the gearing 23, and drips through the opening 41 in the bottom of said housing into the interior of the crank casing. For this reason, therefore, as stated, the water-circulating pipe 33 is preferably divided into sections which are connected together by the U-shaped section 36 which extends downward and around the housing 37, and the water passes from the water jacket 35 of two of the cylinders into the connecting space 42 between the two cylinders, and from the latter into the water jacket 43 of the other two cylinders. From the jacket 43 the water passes into the space 44 at the top of the engine and then into the pipe 45 which leads back to the radiator of the cooling system.

The said housing 39 is suitably connected with the sheet metal casing 46 which is made in sections (one for each valve) and which encloses the spherical valves and which provides the bearings for the hollow shaft 11, in a manner that will be readily understood. The rings 47 encircle the said bearings between the valves, and a sheet metal cap plate 48 extends over the casing 46 in order to close the more or less hollow construction at the top of the engine. A narrow metal plate 49, which is of substantial thickness, is applied to the top of the sheet metal cap plate 48, below the sheet metal wall 50 of the exhaust manifold, so that this plate 49 separates the fuel passage from the exhaust passage, and the heat from the latter is communicated through the said plate 49 to the interior of the manifold 18 to heat the fuel. The bolts 51 are inserted downward through the sheet metal wall 50 and the plate 49, and through the sheet metal plate 48, and into the rings 47 previously mentioned, so that the entire structure is firmly held together. At the center of the engine the screw or bolt 52 is inserted downward through the wall 50 and the plate 49 into a thickened portion of the sheet metal plate 48, and with this construction the upper portion of the engine structure is held firmly together. The bearings 40 for the valves are secured in the upper portions of the cylinders in any suitable manner, it being observed that said cylinders are also made of sheet metal. The water jackets are made of sheet metal, and stuffing boxes 53 are provided for the lower ends of the water jackets, each stuffing box encircling one of the cylinders and having a packing ring 54 to prevent leakage of the water. The crank casing and practically the entire body structure is made of sheet metal in the manner shown.

The spark plugs 55 are mounted in the valves, at opposite sides thereof, so that each valve has two oppositely disposed spark plugs. The tube 16 is provided with vertically movable contacts 56 adapted to engage the conductor 57 which extends lengthwise through the said tube at the bottom thereof, and which is connected with the secondary coil 58 of the ignition system. One terminal or electrode of each spark plug is adapted to engage the contacts 56 when the spark plugs are at the bottom, in position to ignite the fuel in the engine, thereby to raise these contacts 56 into engagement with said conductor 57, the other terminal or electrode of each spark plug being grounded on the engine, so that the secondary coil circuit, which includes the coil 58, is through the latter and then through the conductor 57, through whichever spark plug is at the bottom of its valve, and then through the structure of the engine to the circuit conductor at 59 and back to the coil. The primary coil 60, it will be seen, is connected to the outer end of a conductor 61 that extends lengthwise through the tube 16 at the top thereof, and which is provided with movable contacts 62 to break the continuity of the said conductor, these contacts 62 being preferably pieces of spring brass which are pushed downwardly by the other contacts 63, (each control 63 is of insulating material) whenever one of these contacts is engaged by one of the plugs. In this way, and while one plug is in a closed circuit including the secondary coil 58, the other plug directly above in the same valve is maintained in open circuit with the coil 60, which circuit includes the battery 64, one pole of the latter being connected to the coil 60 and the other pole being connected to the engine at 65, and the left hand end of the conductor 61 being grounded on the engine at 66, so that both coils utilize the structure of the engine as a part of their circuits. Each time the secondary circuit is closed by one of the plugs, causing the sparking action which is necessary to ignite the fuel, the primary circuit is opened, and this break in the primary circuit inductively produces a current in the secondary circuit to insure the desired sparking action between the electrodes of the plug which is in position to ignite the compressed charge in one of the engine cylinders. Thus the two plugs of each valve cooperate to control the circuits of the ignition system, and while one charge is fired by one plug, the next charge (in the same cylinder), it will be seen, is fired or ignited by the other plug of the same valve, it being understood that the cranks on the shaft 9 and the valves on the hollow shaft 11 are so relatively arranged that explosions occur successively in the different cylinders, each cylinder and its valve and other parts constituting a four-cycle internal combustion engine. Therefore, as previously stated, the crank shaft 9 rotates four times for each single rotation of the valve shaft 11, in a manner that will be readily understood.

To clean the spark plugs, thumb screws 67 are inserted downwardly through the plate 49, and are provided with brushes 68 for engaging the electrodes of the spark plugs, so that the latter are brushed each time they pass these thumb screws at the top of the engine. The stationary tube 16 is preferably of some insulating material, as it supports the electrical conductors, but practically the entire body structure of the engine, as previously stated, is of sheet metal. Any suitable metal can be employed for the construction of the different parts which will best serve the purpose. Preferably, the tube 16 is adapted for rotational adjustment, as for example, by means of a handle 69 at its outer end, which will afford some variation in the timing of the ignition. The sheet metal crank casing is cooled by the water which flows through the passage formed by the pipe 33, and this also cools the lower ends of the sheet metal cylinders, the latter being clamped or otherwise firmly secured upon the top of the crank casing by means of the flanged plates 70, or in any suitable manner, it being essential, of course, that the lower ends of the cylinders be very firmly secured to the crank casing in order to resist the thrust of the pistons.

Any suitable provision can be employed for introducing the oil into the chamber of the crank casing, so as to keep the supply therein sufficient to meet all the requirements. The lubricating oil, of course, in the space 31, does not interfere with the operation of the contacts of the ignition system, and it will also be observed that some of the lubricating oil will flow along the outside of the hollow shaft 11, after escaping through the small openings in the latter, and will, by leakage around the valves, lubricate the special valves on their seats. The valve seats 40 are subject to upper pressure by the explosions to force them tight against the valves. Of course, though, as previously explained, the splash lubrication employed is sufficient to lubricate the pistons in the cylinders. With the construction shown and described, the spark plugs are self-timing, so to speak, inasmuch as their rotation serves to open and close the primary and secondary circuits, at the proper time, thus obviating the necessity of a separate timer. The interior of the valves which carry the spark plugs is, of course, of such character that the mixture or fuel passes through from the inlet manifold to the cylinders, around the spark plugs in the valves, and the openings in the sides of the spherical or semi-spherical valves are so positioned or arranged that the valves will admit the fuel at the proper time and will then release the exhaust from the cylinders into the exhaust manifold.

What I claim as my invention is:—

1. In an internal combustion engine, the combination of rotary valves therefor to control the admission of the fuel thereto and the exhaust of the products of combustion therefrom, spark plugs mounted on said rotary valves, and stationary means extending axially through said valves to supply electric current to said plugs.

2. In an internal combustion engine, the combination of a rotary valve, a spark plug carried by said valve, and stationary means within the valve to supply electric current to said plug.

3. In an internal combustion engine, the combination of a crank shaft therefor, a rotary valve, a spark plug on said valve, mechanism for transmitting power from said crank shaft to rotate the valve, and stationary means within the valve to supply electric current to said plug.

4. A structure as specified in claim 3, comprising means to shift said stationary means to time the action of said plug.

5. A structure as specified in claim 3, comprising means to rotate said stationary means to time the action of said plug.

6. A structure as specified in claim 3, said mechanism comprising means on the crank shaft, in combination with an oil pump operated by said means and an oil supply system extending through said valve and fed with oil from said pump.

7. In an internal combustion engine, the combination of a rotary member, a spark plug mounted on said member, and mechanism for operating said member, stationary means extending axially through said member, and contacts in said stationary means to supply electric current to said plug.

8. A structure as specified in claim 7, in combination with means to adjust said stationary means within the member to time the operation of the spark plug.

9. In an internal combustion engine, the combination of a movable member, a spark plug carried by said member, and stationary means in said member to supply electric current to said plug, together with mechanism for operating said member.

10. In an internal combustion engine, the combination of a movable spark plug having a path of travel, and stationary contact means disposed adjacent said path of travel to supply electric current to the plug.

11. A structure as specified in claim 2, in combination with primary and secondary induction coils, and a source of current controlled by said plug to form a circuit through said primary coil and source of current, and controlled by said plug to form a closed circuit through the secondary coil and the plug itself when the primary circuit is open.

12. In an internal combustion engine, a spark plug forming part of the ignition system for the engine, means for revolving the plug about an axis, and means whereby the said ignition system is automatically self-timed by reason of the revolving motion of the spark plug, comprising stationary contacts for engagement with the plug.

13. In an internal combustion engine, the combination of a spark plug, means for giving the spark plug movement during the operation of the engine, and means whereby the ignition system, of which said spark plug is a part, is automatically self-timed by reason of the motion of the spark plug, comprising stationary circuit closing and opening means disposed in position to be engaged by said plug.

14. In an internal combustion engine, the combination of a rotary valve, a hollow shaft for said valve, and a stationary tube extending through said hollow shaft, together with an ignition system comprising contacts and electrical conductors carried by said tube.

MEYER NUTA.